United States Patent
Jamadagni et al.

(10) Patent No.: US 10,356,669 B2
(45) Date of Patent: Jul. 16, 2019

(54) SYSTEM AND METHOD OF PROVIDING CALLING BASED SERVICE TO A CSFB DEVICE FROM A PS NETWORK

(71) Applicant: RELIANCE JIO INFOCOMM LIMITED, Mumbai (IN)

(72) Inventors: Satish Nanjunda Swamy Jamadagni, Karnataka (IN); Sarvesha Anegundi Ganapathi, Karnataka (IN); Pradeep Krishnamurthy Hirisave, Karnataka (IN)

(73) Assignee: RELIANCE JIO INFOCOMM LIMITED, Mumbai, Maharashtra (IN)

( * ) Notice: Subject to any disclaimer, the term of this patent is extended or adjusted under 35 U.S.C. 154(b) by 152 days.

(21) Appl. No.: 15/167,954

(22) Filed: May 27, 2016

(65) Prior Publication Data
US 2016/0353333 A1 Dec. 1, 2016

(30) Foreign Application Priority Data
May 29, 2015 (IN) .......................... 2096/MUM/2015

(51) Int. Cl.
*H04W 36/00* (2009.01)
*H04W 80/04* (2009.01)

(52) U.S. Cl.
CPC ... *H04W 36/0022* (2013.01); *H04W 36/0055* (2013.01); *H04W 80/04* (2013.01)

(58) Field of Classification Search
CPC ......... H04W 36/0022; H04W 36/0055; H04W 80/04
USPC ......................................................... 370/331
See application file for complete search history.

(56) References Cited

U.S. PATENT DOCUMENTS

| | | | | |
|---|---|---|---|---|
| 2010/0279648 A1* | 11/2010 | Song | H04W 4/22 | 455/404.1 |
| 2010/0329243 A1* | 12/2010 | Buckley | H04W 48/18 | 370/352 |
| 2010/0329244 A1* | 12/2010 | Buckley | H04W 76/16 | 370/352 |
| 2011/0002327 A1* | 1/2011 | Dwyer | H04W 48/18 | 370/352 |
| 2011/0249624 A1* | 10/2011 | Ramachandran | H04W 48/18 | 370/328 |
| 2011/0249650 A1* | 10/2011 | Seppanen | H04W 76/026 | 370/331 |

(Continued)

*Primary Examiner* — Christopher R Crompton
(74) *Attorney, Agent, or Firm* — Ladas & Parry, LLP

(57) ABSTRACT

Systems and methods may provide at least one service to a user equipment in an IP network subsystem supporting packet based services, wherein the user equipment is operating in a voice centric mode. Embodiments may receive a broadcast of at least one information of the IP network subsystem through at least one system information message, determine a network capability information at the user equipment based on the at least one information of the IP network subsystem, switch the user equipment from the voice centric mode to a data centric mode, wherein in the data centric mode, the user equipment is subscribed to receive the packet based services, latch the user equipment with the IP network subsystem when one of an over the top and a rich communication service allows the latching, and receive the at least one service at the user equipment via one of the over-the-top and the rich communication services.

12 Claims, 6 Drawing Sheets

(56) References Cited

U.S. PATENT DOCUMENTS

| | | | |
|---|---|---|---|
| 2011/0305192 A1* | 12/2011 | Faccin | H04W 48/18 370/328 |
| 2014/0235242 A1* | 8/2014 | Granzow | H04W 48/17 455/436 |
| 2016/0192251 A1* | 6/2016 | Chebolu | H04W 36/0088 455/404.1 |
| 2016/0269942 A1* | 9/2016 | Olsson | H04W 36/0022 |

* cited by examiner

SYSTEM AND METHOD OF PROVIDING CALLING BASED SERVICE TO A CSFB DEVICE FROM A PS NETWORK

CROSS REFERENCE TO RELATED APPLICATIONS

This application claims the benefit of and priority to Indian Patent Application No. 2096/MUM/2015 filed on 29 May, 2015, the disclosure of which is hereby incorporated in its entirety by reference.

TECHNICAL FIELD

Embodiments of the present disclosure generally relate to communication systems. More particularly, embodiments of the present invention relate to providing services, such as calling based services, though a network having packet based functionality, such as LTE (long term evolution), to the circuit switch fall back (CSFB) devices.

BACKGROUND

The inventors have recognized several problems in the field of communication systems and network environments. In a long term evolution (LTE) network environment, there may be two mechanisms for providing voice services. One mechanism may be through the support of voice over LTE (VoLTE), and the other may be through the circuit switch fall back (CSFB) mechanism. A user equipment (UE) may be one of a voice centric device and a data centric device. In the LTE network environment, the mechanism to support voice services includes using over the top (OTT) applications which are fully supported as voice calling applications in LTE networks or rich communication suite/services (RCS) application which are used as a voice calling application. With the evolution of user equipment, there has been a proliferation of CSFB supporting devices, but not the VoLTE (Voice over LTE) supporting devices. Therefore, the LTE network that can support only VoLTE and RCS framework may not be advantageous as the LTE network is not capable of supporting the current CSFB supporting devices for providing calling based services in the LTE network.

In an LTE network architecture, the CSFB mechanism in EPC (Enhanced Packet Core) enables provisioning of the voice and traditional circuit switch (CS)-domain services (e.g. CS UDI video/SMS/LCS/USSD). Hence, to provide these services, the LTE network may reuse the CS infrastructure while the UE is served by E UTRAN (evolved universal terrestrial access network). A CSFB supporting user equipment connected to E UTRAN may use GERAN (GSM EDGE radio access network) or UTRAN to connect to the CS domain. However, this function may be only available in case E UTRAN coverage is overlapped by either the GERAN coverage or the UTRAN coverage.

Further, the voice over LTE (VoLTE) scheme for providing voice over the LTE network may utilize IMS (IP Multimedia Subsystem) for enabling the VoLTE to be a part of the rich communication services. However, this is only an option chosen by the GSMA (GSM Association) for use on LTE and is the standardized method for providing services such as SMS, voice over LTE and video call over LTE.

The CSFB and the IMS based services can co-exist in a same operator network. However, to support CS fallback functionality is not routine, and requires all participating elements such as the user equipment, mobility management entity (MME), mobile switching center (MSC) and E-UTRAN to support additional functionalities such as maintaining quality of service (QoS), serving gateway (SGW) and program dependency graph (PDG) using the policy and charging rules function (PCRF).

Furthermore, with the LTE only network and a limited LTE device with CSFB capability having no VoLTE functionality, there arises a situation where the device may not be able to latch to the network since the LTE network does not allow CS services. Accordingly, as per the 3GPP standard, for example, if the user equipment is in CS/PS mode 1, the device may try to move and latch to the 2G/3G network having voice calling functionality. However, for the LTE only network, the situation may be raised to keep the user equipment with the LTE network for all the high-speed Internet services.

Furthermore, both the CSFB and the VoLTE devices by default may be voice centric in nature. Therefore, in one scenario, if the LTE network does not support CSFB mechanism, then the CFSB capable devices may not attach to such LTE only network at all. This can be an issue in networks that support only data services in LTE networks.

Accordingly, there is a need for systems and methods for providing services such as voice calling through an LTE only network to the legacy devices supporting CSFB mechanism.

Certain embodiments of the present disclosure solve this need, and may provide a mechanism that modifies the specifications of user equipment to allow latching of the user equipment onto the LTE only network for high-speed Internet services as well as services such as voice calling via OTT (Over-the-top) or RCS (Rich Communication Services) based applications.

SUMMARY

Embodiments of the present disclosure may provide calling based services to legacy devices which may be operable only in a circuit switch fallback mechanism, and which cannot access said services directly from a network having only packet based service and having no circuit switch functionality. Embodiments of the present disclosure encompass a system for providing at least one service to a user equipment in an IP network subsystem supporting only packet based services, wherein the user equipment is operating in a voice centric mode. The system may comprise a broadcast module configured to broadcast at least one information of the IP network subsystem in a system information message; a call control entity configured to determine network capability information based on the at least one information of the IP network subsystem; a triggering module configured to switch the user equipment from the voice centric mode to a data centric mode, wherein the user equipment may be subscribed to receive the packet based services in the data centric mode; and a service provider module configured to allow the user equipment to latch onto the IP network subsystem, wherein the service provider module may allow the user equipment to avail the at least one service through one of an over-the-top and a rich communication services based scheme.

Further, the embodiments of the present disclosure encompass a method of providing at least one service to a user equipment in an IP network subsystem supporting packet based services wherein the user equipment is operating in a voice centric mode. The method may include steps of receiving a broadcast of at least one information of the IP network subsystem through at least one system information message; determining a network capability information at the user equipment based on at least one information of the IP network subsystem; switching the user equipment from the voice centric mode to a data centric mode, wherein in the data centric mode, the user equipment may be subscribed to receive the packet based services; latching the user equipment with the IP network subsystem when one of an over-the-top and a rich communication service allows the latching; and receiving the at least one service at the user equipment via one of the over-the-top and the rich communication services.

DETAILED DESCRIPTION

Figure 1:
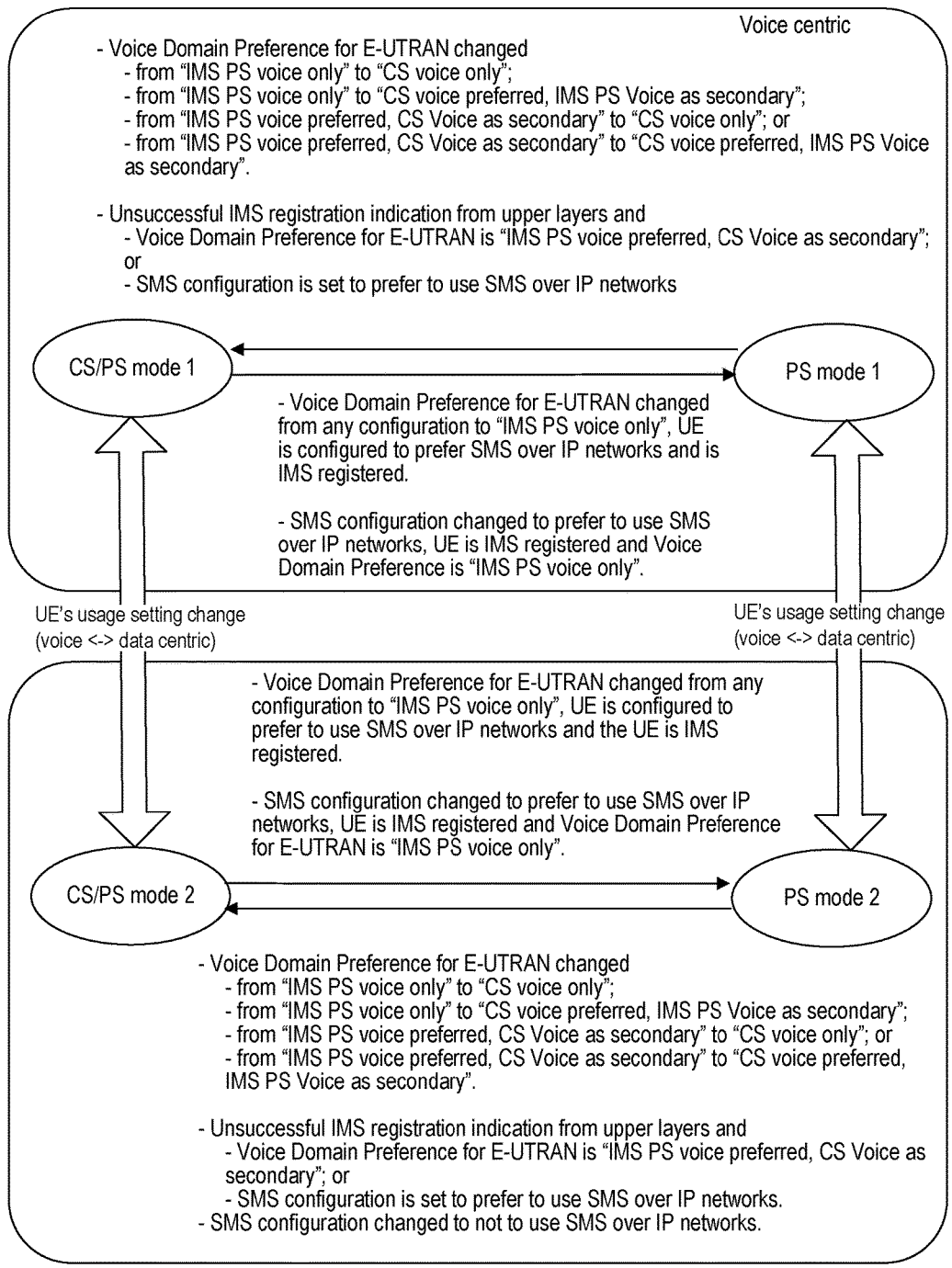
FIG. 1 illustrates a schematic block diagram of the prior art.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure include systems and methods of providing services such as voice calling, through a long term evolution (LTE) only network having no voice over LTE (VoLTE) capability, to an end user device (herein after referred to as a user equipment). This may be achieved by modifying the mode of the user equipment from a voice centric mode to a data centric mode, wherein the user equipment (UE) is a circuit switch fallback (CSFB) legacy device having voice centric capabilities.

A system of the present disclosure may comprise a user equipment to which voice calling service is to be delivered via a service provider module, wherein the service provider module allows the user equipment to latch onto the LTE only network for providing said voice calling services. The system may comprise a module for receiving broadcasting of a system information message, wherein the system information message contains information indicative of an IP network subsystem to determine the network capability of the IP network subsystem. Further, the system comprises a call control entity for determining the network capability information based on information broadcasted by the broadcast module of the IP network subsystem. Furthermore, the system comprises a triggering module for switching the user equipment from a voice centric mode to a data centric mode to avail the voice calling services, wherein the user equipment is subscribed to receive the packet based services in said data centric mode. The voice calling services is provided to the user equipment via one of an over the top (OTT) and a rich communication services (RCS) based scheme.

The LTE network may support two mechanisms for providing voice calling services to the user equipment: one is through the VoLTE and the other is through the circuit switch fall back mechanism. Further, in general, a user equipment may be one of data centric and voice centric in nature. Therefore, the user equipment may bind to the evolved packet code (EPC) network; i.e. evolved packet system (EPS) services shall operate in one of the following operation modes:

1. Packet Switch (PS) mode 1 of operation: the user equipment registers only to EPS services, and the usage setting of the user equipment is "voice centric" in nature.
2. Packet Switch (PS) mode 2 of operation: the user equipment registers only to EPS services, and the usage setting of the user equipment is "data centric" in nature.
3. Circuit Switch/Packet Switch (CS/PS) mode 1 of operation: the user equipment registers to both EPS and non-EPS services, and the usage setting of the user equipment is "voice centric" in nature; and
4. Circuit Switch/Packet Switch (CS/PS) mode 2 of operation: the user equipment registers to both EPS and non-EPS services, and the usage setting of the user equipment is "data centric" in nature.

The devices supporting CSFB and VoLTE may come with the setting of CS/PS mode 1 or PS mode 1 settings by default which is a voice centric setting. The user equipment configured to use CSFB may operate in one of the CS/PS mode 1 of operation and the CS/PS mode 2 of operation.

In order to provide a solution for the LTE only networks which provide voice calling services through IP multimedia subsystem network without necessarily using the VoLTE signaling mechanisms, and instead through the RCS based mechanism for the voice calling services, it may be necessary to modify the signaling procedures for a user equipment. The user equipment may have a voice centric nature that operates in a multi-mode (as is in many devices in the market). If the device determines that the network supports voice only by means of VoLTE or CSFB, the user device may be attached to the network as a data device and may use the RCS services for voice/video calling rather than attaching to a 2G/3G legacy network. However, in the prior art illustrated in FIG. 1, there is no mechanism to facilitate an automatic switch from the CS/PS mode 1 of operation to the PS mode 2 of operation, or from the PS mode 1 of operation to the PS mode 2 of operation.

In the prior art, as illustrated in FIG. 1, in an event, the network is in the ATTACH ACCEPT message, in response to the "Accept" message by the user equipment, and includes the additional update result information element (IE) which indicates the list of services that are supported by the network. With value "SMS only" or "CS Fallback not preferred" or "CS service not available", a user equipment operating in the CS/PS mode 1 of operation with "IMS voice calling service not available" may attempt to select one of the GSM EDGE Radio Access Network (GERAN) and Universal Terrestrial Radio Access Network (UTRAN) radio access technology rather than Evolved Universal Terrestrial Radio Access Network (E-UTRAN) for the registered public land mobile network (PLMN) or any similar equivalent PLMN, and disable the EUTRA capability. As a result, the user equipment may detach from the LTE network and seeks for the 2G/3G network which is not preferred for a Greenfield LTE deployment.

Figure 2:
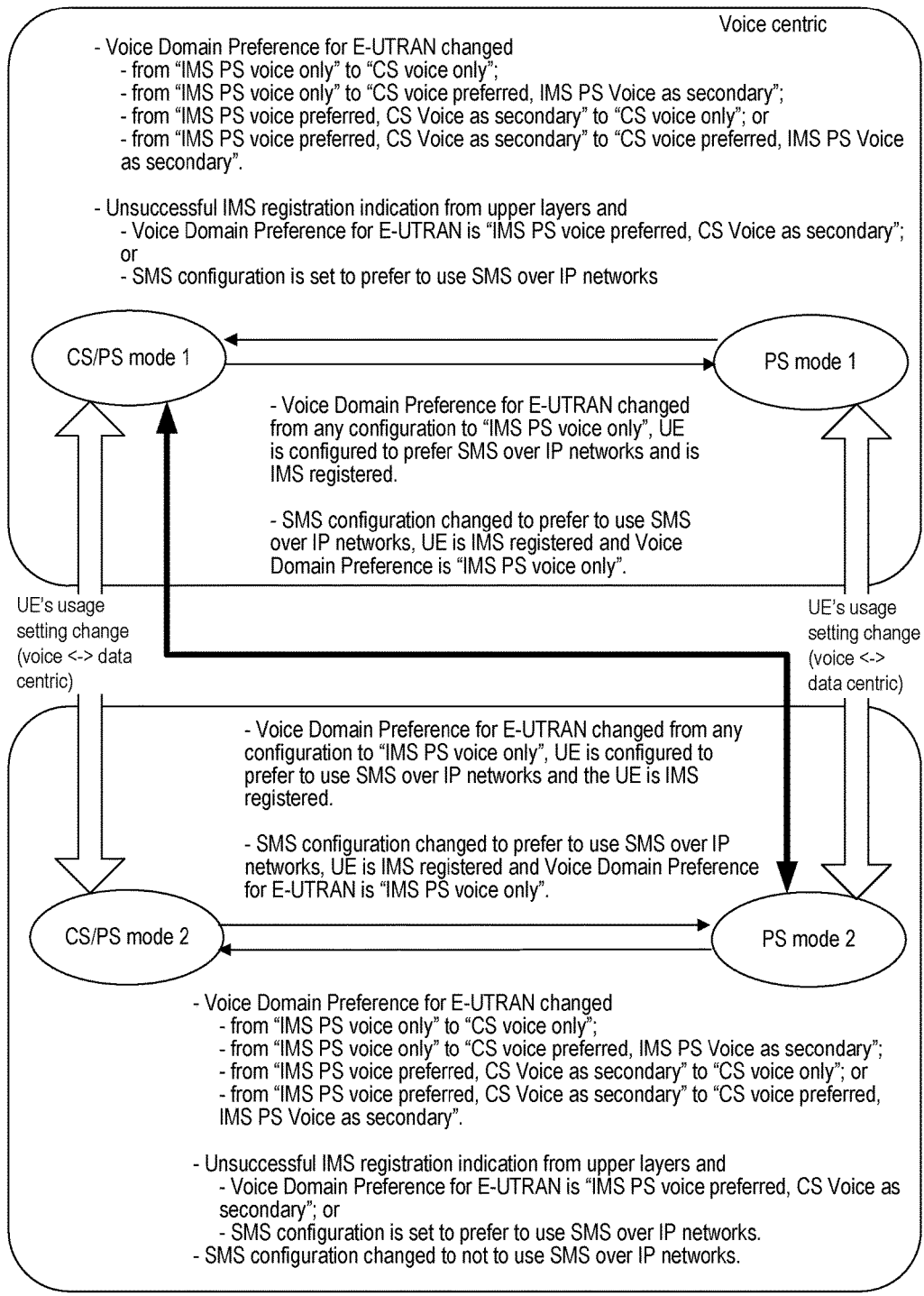
FIG. 2 illustrates a schematic block diagram of an exemplary embodiment of the present disclosure for switching the user equipment from a voice centric mode to a data centric mode.

As illustrated in FIG. 2, exemplary embodiments of the present disclosure encompass dynamic switching of the user equipment from a voice centric mode of operation to a data centric mode of operation, for providing voice calling services to a circuit switch fallback (CSFB) legacy device through a long term evolution (LTE) network only. For LTE Greenfield operation networks, it is required that the voice services are provided by an over the top (OTT) application like the rich communication system (RCS) application through the IMS network. Based on the network capability through information element (IE), the user equipment may switch the mode of operation from either PS mode of operation 1 or CS/PS mode of operation 1 to PS mode of operation 2. Further, the embodiments of the present disclosure encompass an automatic mechanism to switch the mode of operation from one of the CS/PS mode 1 and the PS mode 1 to the PS mode 2, based on the user equipment reading the new CS/PS mode capability information of the network.

Figure 3:
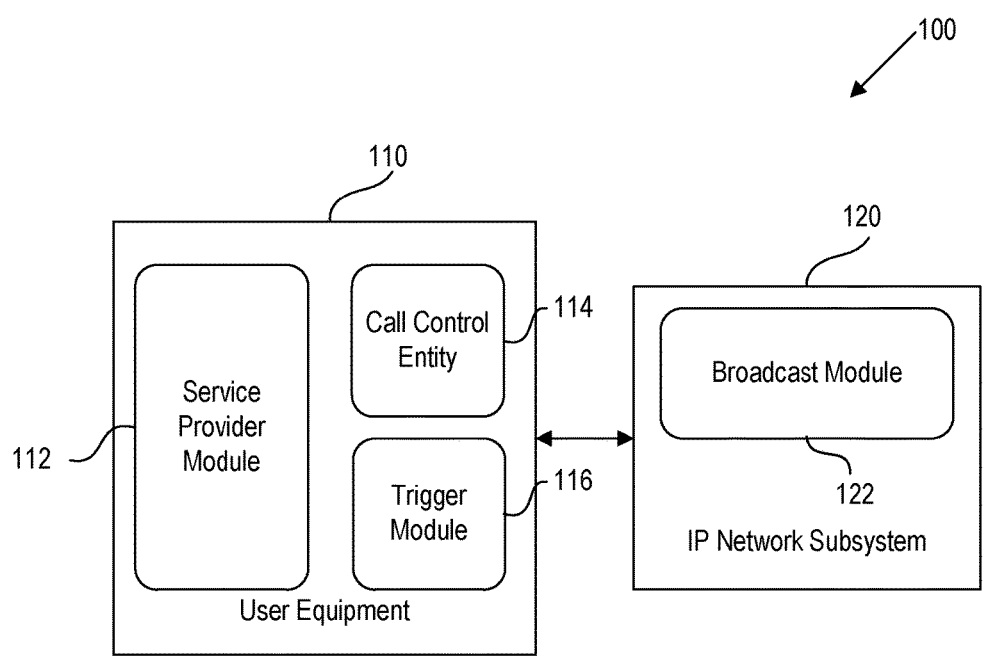
FIG. 3 illustrates a simplified system architecture of embodiments of the present disclosure.

FIG. 3 illustrates a system architecture consistent with embodiments of the present disclosure. The present disclosure encompasses a system 100 for providing a service such as voice calling, to a user equipment 110 in an IP network subsystem 120 supporting only packet based services, wherein the user equipment 110 is operating in a voice centric mode. The system 100 comprises a broadcast module 122 for broadcasting at least one information; a call control entity 114 for determining the network capability information based on at least one information; a triggering module 116 for switching of the user equipment from the voice centric mode to a data centric mode; and a service provider module 112 for allowing the user equipment to latch onto the IP network subsystem for providing said services. Further, the user equipment 110 as used herein is a circuit switch fallback device configured to operate in a voice centric mode. The user equipment 110 may also include a module for receiving a broadcast from the broadcast module 122.

The broadcast module 122 as used herein is an integral part of the IP network subsystem 120. Further, the IP network subsystem 120 as encompassed by the present disclosure supports only packet based services which may belong to a wide range of network such as 2G, 3G and 4G in which there is no active voice calling functionalities enabled. Furthermore, the IP network subsystem 120 as used herein may be implemented using wireless standards.

The broadcast module 122 is configured to broadcast information such as a system information through a system information message. The system information is not limited to NAS common information; information applicable for UEs in RRC_IDLE, e.g. cell (re-) selection parameters, neighboring cell information and information (also) applicable for UEs in RRC_CONNECTED, e.g. common channel configuration information including ETWS notification, CMAS notification, etc. may also be included. Further, in addition to broadcasting, the Evolved Universal Terrestrial Radio Access Network (E-UTRAN) may provide System Information Block Type 1, including the same parameter values, via dedicated signaling i.e., within an RRC Connection Reconfiguration message. Moreover, the system information message as encompassed by the present disclosure may comprise a plurality of one bit indicator information for indicating the network capability information of the IP network subsystem, wherein the one bit indicator information may be one of a real time and pre-stored (after receiving from a previously broadcasted system information message) indicator. The user equipment 110 may use the previously stored one bit information to determine the network capability information in an event there is no real-time broadest of system information message detected. As encompassed by the present disclosure, the network capability information facilitates detecting of whether the IP network subsystem has a circuit switching capability or a packet switching capability.

A task of the call control entity 114 as used herein is configured to decode/decrypt the system information received from the IP network subsystem and identify the network capability information of the IP network subsystem. Further, the network capability information assists the system to determine the nature of the IP network subsystem which is one of voice centric and data centric.

The triggering module 116 as used herein is configured to switch the user equipment from a voice centric mode to a data centric mode, wherein the user equipment is subscribed to receive the packet based services from the IP network subsystem. As encompassed by the present disclosure, the triggering module 116 may switch the user equipment from voice centric mode to data centric mode using an applet configured at a subscriber identity module of the user equipment 110.

The service provider module 112 is configured to allow the user equipment 110 to latch onto the IP network subsystem 120 having only packet based services, wherein the service provider 112 module allows the user equipment 110 to avail the at least one service through one of an over the top and a rich communication services based scheme. Further, one of the over the top and the rich communication services allows the latching based on reading of the network capability information and the type of the user equipment for e.g. the user equipment 110 is detected as a circuit switch fallback device.

The present disclosure further encompasses switching of the user equipment from the voice centric mode to the data centric mode in an event the system information message contains information which identifies that the IP network subsystem supports only the packet based services. Alternatively, the user equipment is switched from the voice centric mode to the data centric mode in an event the system information message does not contain any network capability information. Yet alternatively, the user equipment is switched from the voice centric mode to the data centric mode in an event a mobile mobility entity instructs the user equipment about an unavailability of a circuit switch functionality at the IP network subsystem.

Figure 4A:
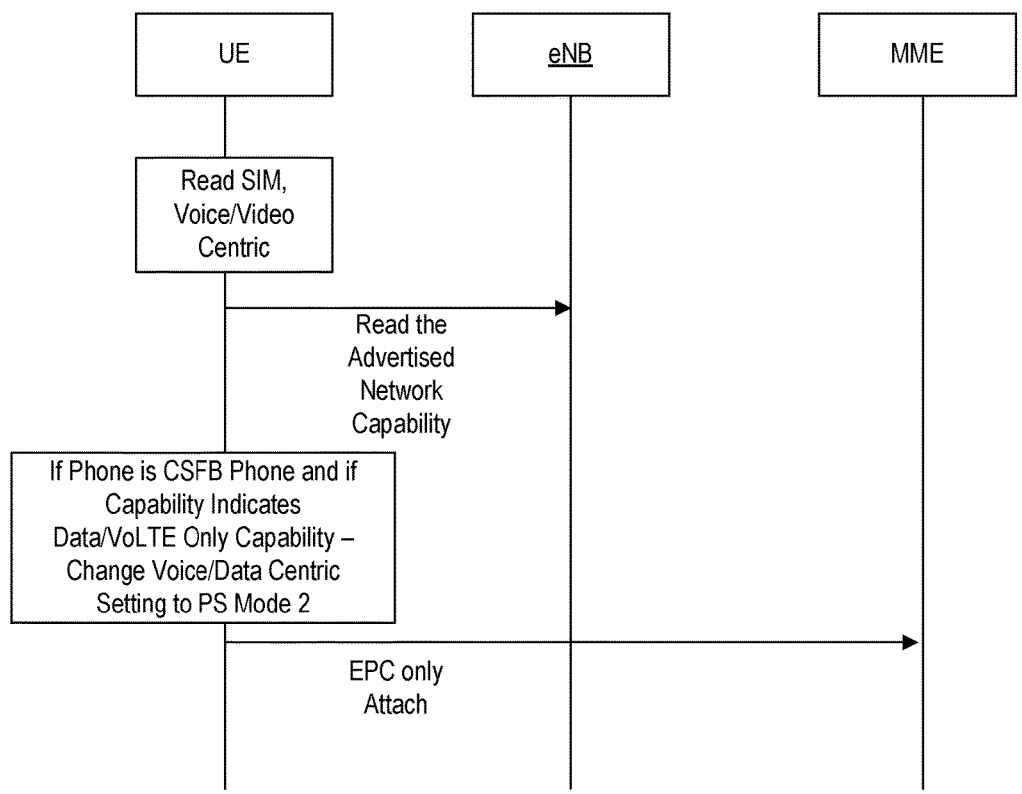
FIG. 4a illustrates an exemplary information flow diagram of embodiments of the present disclosure.

In an embodiment, as illustrated in FIG. 4a, the network capability is advertised in a system information message. The system information message provides information indicating the network compatibility such as the network supports only LTE data services as well as OTT based voice solutions and/or voice over LTE (VoLTE). The user equipment behavior of switching between the voice centric to a data centric mode is then dictated by such a network capability reading rather than a preset Voice/Data centric settings. The user equipment shall use this information to appropriately change the packet switch (PS) mode from PS mode 1 of operation to PS mode 2 of operation. Similarly, in case of the circuit switch fallback (CSFB), it would be from the CS/PS mode 1 to PS mode 2 in the non-volatile memory of the user equipment. After reading the system information about the LTE network capability, the user equipment appropriately sends the attach message with "EPC attach only" settings and does not attempt to do a combined attach, wherein the combined attach is a default behavior in a voice centric user equipment in which the user equipment attempts to attach to both the packet switched network and circuit switched networks, i.e. to both the evolved packet core and to a mobile switching center of the 2G/3G network. In a non-combined attach, the user equipment attaches to the EPC only for data services since there is no mobile switching center in the network.

The user equipment may have the following details to evaluate the network capability information:
Ensure having a valid version, as defined below, of (at least) the following system information, also referred to as the 'required' system information:
if in RRC_IDLE:
the 'Master Information Block' and 'System Information Block Type1' as well as 'System Information Block Type2' through 'System Information Block Type8', depending on support of the concerned RATs;
if in RRC_CONNECTED:
the 'Master Information Block', 'System Information Block Type1' and 'System Information Block Type2' as well as 'System Information Block Type8', depending on support of CDMA2000;
Delete any stored system information after 3 hours from the moment it was confirmed to be valid, for change of system information (other than for ETWS, CMAS and EAB parameters). This only occurs at specific radio frames, unless specified otherwise; and
Consider any stored system information except 'System Information Block Type10', 'System Information Block Type11', 'System Information Block Type12' and 'System Information Block Type14' to be invalid if 'System Info Value Tag' included in the 'System Information Block Type1' is different from the one of the stored system information.

Figure 4B:
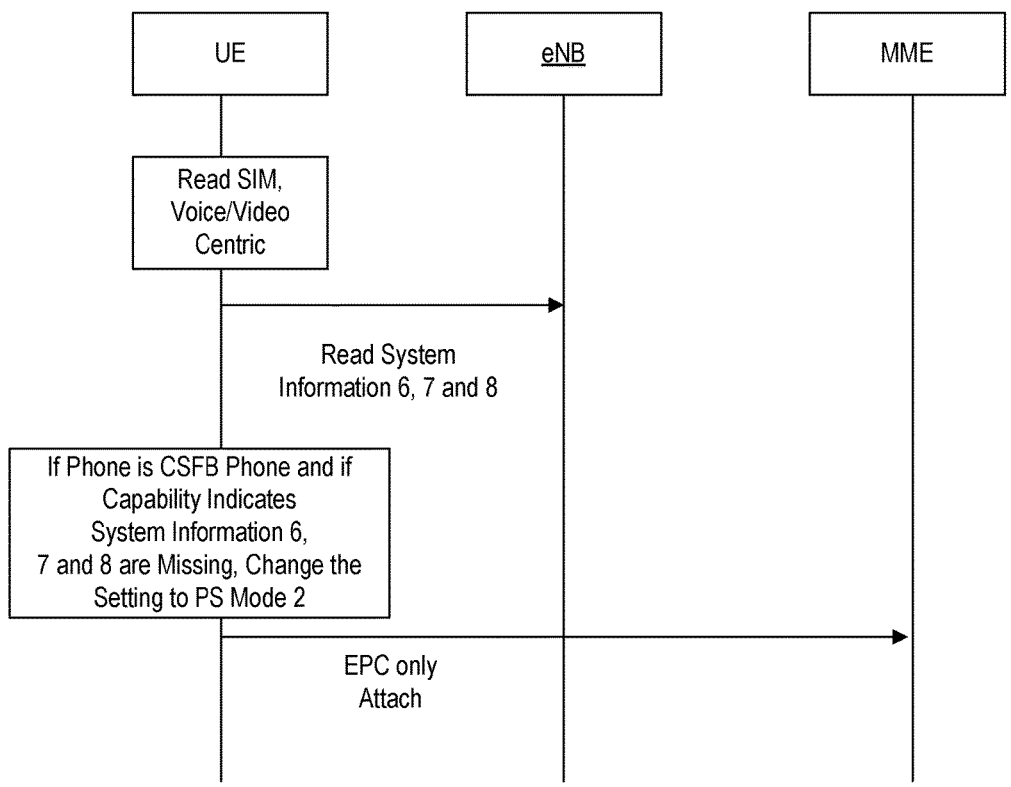
FIG. 4b illustrates an exemplary information flow diagram of embodiments of the present disclosure.

In another embodiment, as illustrated in FIG. 4b of the present invention, if in a network the UE does not find system information 6, 7 and 8, the same is inferred as the network only supports LTE packet switch (LTE PS) mode and the user equipment shall set the Attach message to "LTE EPC attach only". Subsequently, the user equipment sets the PS mode of operation as PS mode 2 of operation and CS/PS mode of operation to CS/PS mode 2 of operation. Alternatively, the user equipment may be allowed to skip reading system information 6, 7 and 8, before attempting an Attach procedure with the network.

In yet another embodiment of the present disclosure, the Attach Accept message sent from a Mobility Management Entity (MME) in the LTE network indicates the unavailability of circuit switch (CS) networks and instructs the user equipment to switch to packet switch (PS) mode of operation 2. In such a scenario, the MME indicates the LTE network using a new cause in the Evolved Mobility Management (EMM) message, wherein the new cause element is a new Information Element, or a field is introduced in the EMM message to indicate that the network does not support combined attach which in turn means that the network does not support circuit switch fallback. For example, the string value 0111 1111 may indicate that no CS services are allowed in the network but the user equipment is allowed to continue in LTE network for PS services only.

Figure 5:
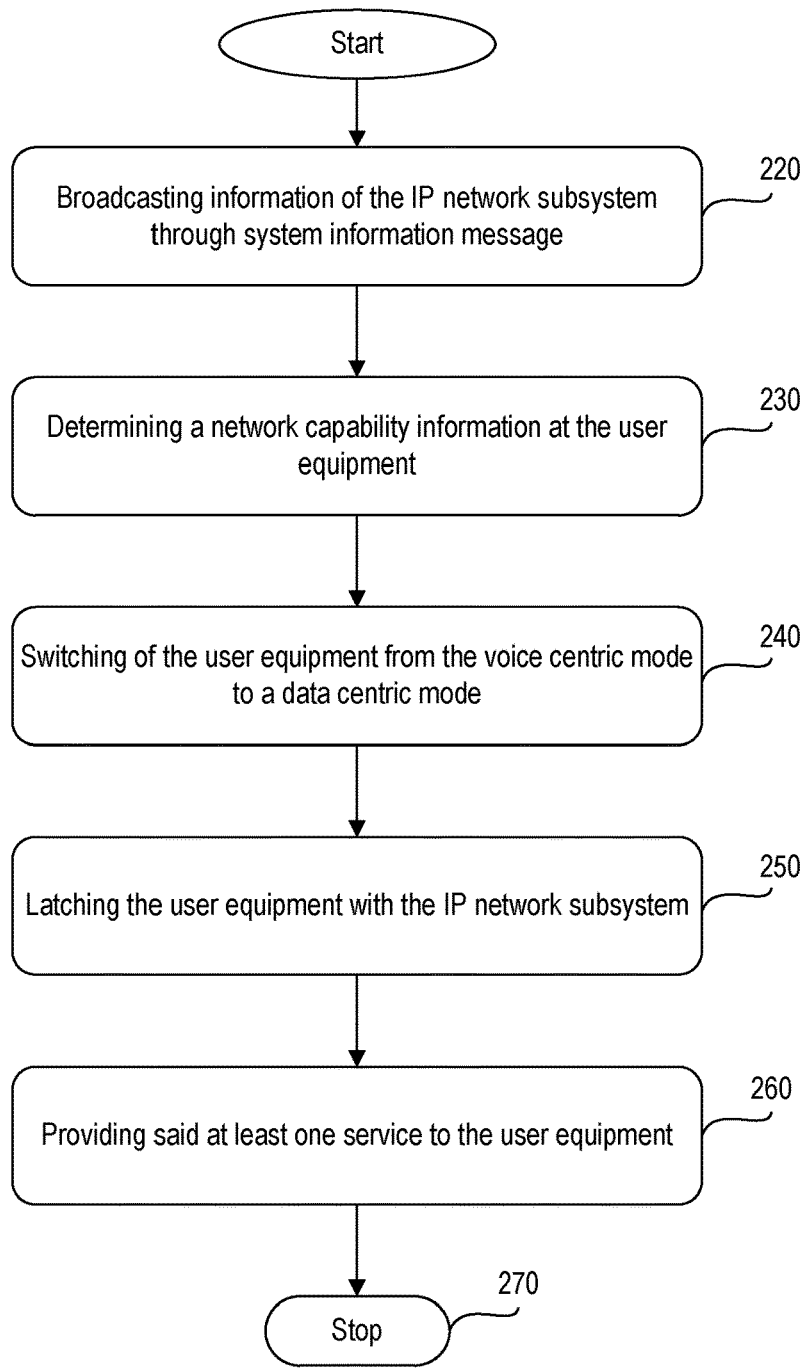
FIG. 5 illustrates a method of providing voice calling services to a user equipment by dynamically switching the user equipment from a voice centric mode to a data centric mode.

FIG. 5 illustrates a method of providing a calling service to a user equipment by dynamically switching the user equipment from a voice centric mode to a data centric mode. The method 200 initiates at step 210.

At step 220, the IP network subsystem broadcasts an information, wherein the information is broadcasted through a system information message.

At step 230, network capability information is determined at the user equipment based on the information broadcasted by the IP network subsystem.

At step 240, the user equipment is switched from a voice centric mode to a data centric mode, wherein in said data centric mode, the user equipment is subscribed to receive only packet based services.

At step 250, the user equipment is latched to the IP network subsystem in an event one of an over the top and a rich communication service allows the latching.

At step 260, the user equipment is provided with said calling services through one of an over the top and a rich communication services based scheme. The method 200 terminates at step 270.

Embodiments of the present disclosure may be implemented via a memory containing computer-executable programming instructions, and a processor executing the computer-executable programming instructions. The memory may be a volatile or non-volatile, magnetic, semiconductor, tape, optical, removable, non-removable, or other type of storage device or tangible (i.e., non-transitory) computer-readable medium. The processor may be one or more known processing devices, such as a single-core processor or multiple-core processor that executes parallel processes simultaneously. The processor may also perform non-parallel processes.

While considerable emphasis has been placed herein on the disclosed embodiments, it will be appreciated that many embodiments can be made and that many changes can be made in the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:

1. A method of providing at least one service to a user equipment in an IP network subsystem supporting only packet based services, wherein the user equipment is operating in a voice centric mode, the method comprising steps of:
receiving a broadcast of at least one information of the IP network subsystem through at least one system information message;
determining, by the user equipment, a network capability information of the IP network subsystem based on the at least one system information message, wherein
the user equipment has no packet switching capability; and
the user equipment uses the network capability information for detecting whether the IP network subsystem has a circuit switching (CS) capability or a packet switching (PS) capability;
switching the user equipment from the voice centric mode to a data centric mode, wherein
the user equipment, in the data centric mode, is subscribed to receive the packet based services; and
said switching of the user equipment from the voice centric mode to the data centric mode occurs in one of an event selected from the group consisting of:

the IP network subsystem supporting only the packet based services, the network capability information is absent in the at least one system information message, and an unavailability of the CS capability being indicated to the user equipment by a Mobile Mobility Entity (MME);

latching the user equipment with the IP network subsystem when one of an over the top and a rich communication service allows the latching; and receiving the at least one service at the user equipment in the IP network subsystem supporting only packet based services via one of the over the top and the rich communication services.

2. The method as claimed in claim 1, wherein the IP network subsystem is implemented using at least one wireless standard.

3. The method as claimed in claim 1, wherein the at least one system information message comprises at least a one bit indicator information.

4. The method as claimed in claim 3, wherein the one bit indicator information is one of a real-time and a pre-existing one bit indicator information.

5. The method as claimed in claim 1, wherein the one of the over the top and the rich communication services allows the latching by reading the network capability information and the type of the user equipment.

6. The method as claimed in claim 1, wherein the at least one service provided to the user equipment includes a voice service.

7. The method as claimed in claim 1, wherein the user equipment is capable of registering to evolved packet services in the voice centric mode.

8. The method as claimed in claim 1, wherein the user equipment is capable of registering to both the evolved packet services and non-evolved packet services in the voice centric mode.

9. A system for providing at least one service to a user equipment in an IP network subsystem supporting only packet based services, wherein the user equipment is operating in a voice centric mode, the system comprising:

a module configured to receive a broadcast of at least one information of the IP network subsystem in a system information message;

a call control entity configured to determine a network capability information of the IP network subsystem based on the at least one system information message of the IP network subsystem, wherein;

the user equipment has no packet switching capability; and the user equipment uses the network capability information for detecting whether the IP network subsystem has a circuit switching (CS) capability or a packet switching (PS) capability;

a triggering module configured to switch the user equipment from the voice centric mode to a data centric mode, wherein the user equipment is subscribed to receive the packet based services in the data centric mode; and said switching of the user equipment from the voice centric mode to the data centric mode occurs in one of an event selected from the group consisting of:

the IP network subsystem supporting only the packet based services, the network capability information is absent in the at least one system information message, and an unavailability of the CS capability being indicated to the user equipment by a Mobile Mobility Entity (MME);

a service provider module configured to allow the user equipment to latch onto the IP network subsystem when one of an over the top and a rich communication service allows the latching, wherein the service provider module allows the user equipment to avail the at least one service in the in the IP network subsystem supporting only packet based services via one of the over the top and the rich communication services based scheme.

10. The system as claimed in claim 9, wherein the triggering module switches the user equipment from the voice centric mode to data centric mode using an applet configured at a subscriber identity module of the user equipment.

11. A non-transitory computer readable medium containing computer-executable programming instructions for performing a method of providing at least one service to a user equipment in an IP network subsystem supporting only packet based services, wherein the user equipment is operating in a voice centric mode, the method comprising steps of:

receiving a broadcast of at least one information of the IP network subsystem through at least one system information message;

determining, by the user equipment, a network capability information of the IP network subsystem based on the at least one system information message of the IP network subsystem, wherein the user equipment has no packet switching capability; and the user equipment uses the network capability information for detecting whether the IP network subsystem has a circuit switching (CS) capability or a packet switching (PS) capability;

switching the user equipment from the voice centric mode to a data centric mode, wherein the user equipment, in the data centric mode, is subscribed to receive the packet based services; and said switching of the user equipment from the voice centric mode to the data centric mode occurs in one of an event selected from the group consisting of:

the IP network subsystem supporting only the packet based services, the network capability information is absent in the at least one system information message, and an unavailability of the CS capability being indicated to the user equipment by a Mobile Mobility Entity (MME);

latching the user equipment with the IP network subsystem when one of an over-the-top and a rich communication service allows the latching; and providing the at least one service to the user equipment in the IP network subsystem supporting only packet based services via one of the over-the-top and the rich communication services.

12. The non-transitory computer readable medium as claimed in claim 11, further comprising steps of switching the user equipment from the voice centric mode to the data centric mode using an applet.

* * * * *